United States Patent Office 2,927,925
Patented Mar. 8, 1960

2,927,925

SCOPINE AND SCOPOLINE ESTERS OF ALPHA, ALPHA-DIPHENYL PROPIONIC ACID

Harold E. Zaugg, Lake Forest, Ill., assignor to Abbott Laboratories, North Chicago, Ill., a corporation of Illinois No Drawing. Application October 13, 1958
Serial No. 766,671

7 Claims. (Cl. 260—292)

The present invention is directed to the scopine and scopoline esters of α,α-diphenyl propionic acid represented by the formula:

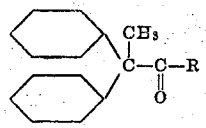

and non-toxic acid addition salts thereof wherein R represents a scopinyl or scopolinyl radical. These compounds are conveniently isolated as their acid addition salts which are crystalline solids readily soluble in water, but of limited solubility in common organic solvents. The basic esters and more particularly their hydrogen chloride addition salts possess interesting pharmacological properties and are useful as anti-spasmodics, gastric-antisecretory agents, anti-Parkinson agents and tranquilizers. For such use, they can be administered orally or by injection and in suppository form if desired.

The new compounds may be prepared by the reaction of α,α-diphenyl propionyl chloride with scopine or scopoline. The reaction is carried out in the presence of a hydrogen chloride acceptor such as pyridine or triethylamine. Good results are obtained when employing substantially equimolecular proportions of the reactants. The reaction takes place smoothly at a temperature of from 20° C. to 125° C. with the formation of the desired ester product and amine hydrochloride of reaction. In a preferred method of operation, the reaction is carried out in the presence of an inert organic solvent such as benzene, carbon tetrachloride or acetone.

In carrying out the reaction, the α,α-diphenyl propionyl chloride dissolved in an inert organic solvent, preferably benzene, is added slowly with stirring to a mixture of scopine or scopoline and a hydrogen chloride acceptor such as pyridine. The reaction mixture is then allowed to stand at room temperature if a scopine ester is desired or heated at the boiling temperature and under reflux if a scopoline ester is desired for a period of time to complete the reaction. The amine hydrochloride of reaction is removed by filtration or dissolved in water. The resulting filtrate or aqueous solution is then made alkaline to liberate the basic ester product which is thereafter extracted with a suitable solvent such as ether or chloroform. The extract is dried and fractionally distilled under reduced pressure to obtain the desired ester. Addition of a slight stoichiometric excess of ethereal hydrogen chloride or other non-toxic acid to the extract containing the basic ester results in the precipitation of an acid addition salt which may be purified by recrystallization from a suitable organic solvent.

The following examples illustrate the invention, but are not to be construed as limiting.

EXAMPLE I

*Scopine ester of α,α-diphenyl propionic acid*

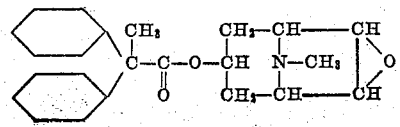

A solution of 7.9 grams (.035 mole) of α,α-diphenyl propionic acid and 5.6 grams (.04 mole) of thionyl chloride in 50 milliliters of dry benzene was heated at the boiling temperature and under reflux for a period of two hours. Following the heating period, the benzene and excess thionyl chloride were removed by distillation under reduced pressure to obtain an α,α-diphenyl propionyl chloride product as a viscous liquid residue. Five grams (.032 mole) of scopine and 30 milliliters of pyridine were thereafter added to the acid chloride product and the resulting mixture allowed to stand at room temperature for two days. Fifty milliliters of water were then added and the reaction mixture made strongly alkaline with a saturated aqueous solution of sodium carbonate to liberate the desired ester which was extracted with ether. The ether extract was dried over anhydrous sodium sulfate and a slight stoichiometric excess of ethereal hydrogen chloride added thereto to precipitate the hydrochloride salt of the scopine ester of α,α-diphenyl propionic acid as a crystalline solid, which after recrystallization from isopropyl alcohol melted at 158°–160° C.

*Analysis.*—Calcd. for $C_{23}H_{25}NO_3 \cdot HCl$: C=69.07%; H=6.55%; N=3.50%. Found: C=69.64%; H=7.82%; N=3.92%.

EXAMPLE II

*Scopoline ester of α,α-diphenyl propionic acid*

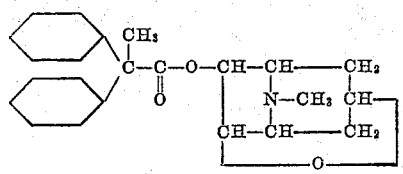

9.78 grams (.04 mole) of α,α-diphenyl propionyl chloride prepared as described in Example I was dissolved in 75 milliliters of dry benzene and added dropwise with stirring over a period of ten minutes to a mixture of 6.1 grams (.06 mole) of triethylamine and 6.2 grams (.04 mole) of scopoline in 75 milliliters of dry benzene. The resulting mixture was heated at the boiling temperature and under reflux for 18 hours to complete the reaction. Upon completion of the reaction, the reaction mixture was extracted with an aqueous solution of hydrochloric acid containing equal parts by weight of acid and water. The acid extract was made strongly alkaline with a saturated aqueous solution of sodium carbonate to liberate the desired scopoline ester product which was thereafter extracted with chloroform. After removal of the chloroform by distillation, the resulting residue was dissolved in absolute ethyl alcohol and a slight stoichiometric excess of ethereal hydrogen chloride added thereto. The solid scopoline hydrochloride which precipitated was removed by filtration and upon the addition of dry ether to the filtrate, there was obtained a hydrochloride salt of the scopoline ester of α,α-diphenyl propionic acid as a crystalline solid. This salt product was recrystallized from isopropyl alcohol and after drying for 20 hours in a vacuum oven at 100° C. in the presence of phosphorus pentoxide, the product melted at 218°–220° C.

*Analysis.*—Calcd. for $C_{23}H_{25}NO_3 \cdot HCl$: C=69.07%; H=6.55%; N=3.50%. Found: C=69.06%, H=6.69%; N=3.62%.

In a manner similar to that employed in the foregoing examples for the preparation of the hydrochlorides, other acid addition salts of the basic scopine and scopoline esters of α,α-diphenyl propionic acid may be prepared by the reaction of said esters with inorganic acids such as sulfuric, nitric or phosphoric acid and organic acids such as oxalic, tartaric, citric, acetic, succinic and cyclohexylsulfamic acid.

What I claim as my invention is:
1. The scopine ester of α,α-diphenyl propionic acid.
2. The scopoline ester of α,α-diphenyl propionic acid.
3. A non-toxic acid addition salt of the scopine ester of α,α-diphenyl propionic acid.
4. A non-toxic acid addition salt of the scopoline ester of α,α-diphenyl propionic acid.
5. The hydrochloride of the scopine ester of α,α-diphenyl propionic acid.
6. The hydrochloride of the scopoline ester of α,α-diphenyl propionic acid.
7. A compound selected from the class consisting of esters corresponding to the formulas

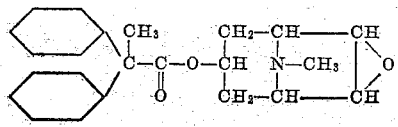

and

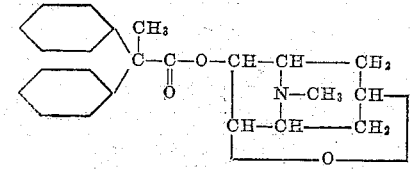

and non-toxic, acid-addition salts thereof.

References Cited in the file of this patent

UNITED STATES PATENTS

| | | |
|---|---|---|
| 2,748,133 | Karrer et al. | May 29, 1956 |
| 2,800,476 | Stoll et al | July 23, 1957 |
| 2,872,452 | Zeile et al. | Feb. 3, 1959 |